US012749008B1

(12) United States Patent
Tomenko et al.

(10) Patent No.: US 12,749,008 B1
(45) Date of Patent: Sep. 29, 2026

(54) AUTOMATED MODEL HYPERPARAMETER DETERMINATION AND SERVING

(71) Applicant: Workday, Inc., Pleasanton, CA (US)

(72) Inventors: Volodymyr Tomenko, San Jose, CA (US); Arun Krishnaswamy, San Ramon, CA (US); Naveen Sundar Govindarajulu, San Jose, CA (US); Narayanan Krishnaswamy, Milpitas, CA (US)

(73) Assignee: Workday, Inc., Pleasanton, CA (US)

( * ) Notice: Subject to any disclaimer, the term of this patent is extended or adjusted under 35 U.S.C. 154(b) by 946 days.

(21) Appl. No.: 17/398,716

(22) Filed: Aug. 10, 2021

(51) Int. Cl.
*G06N 3/0985* (2023.01)
*G06F 8/61* (2018.01)
*G06N 20/00* (2019.01)
*G06F 9/455* (2018.01)

(52) U.S. Cl.
CPC ............... *G06N 20/00* (2019.01); *G06F 8/63* (2013.01); *G06N 3/0985* (2023.01); *G06F 2009/45562* (2013.01)

(58) Field of Classification Search
None
See application file for complete search history.

(56) References Cited

U.S. PATENT DOCUMENTS

| | | | | |
|---|---|---|---|---|
| 10,853,728 | B1 * | 12/2020 | Walters | G06N 3/084 |
| 11,507,876 | B1 * | 11/2022 | Kuo | G06N 20/00 |
| 2019/0236487 | A1 * | 8/2019 | Huang | G06N 20/00 |
| 2021/0224585 | A1 * | 7/2021 | Schmidt | G06F 9/3836 |
| 2021/0397482 | A1 * | 12/2021 | Lantz | G06F 9/5038 |
| 2022/0044149 | A1 * | 2/2022 | Rand | G06V 10/7747 |
| 2022/0327382 | A1 * | 10/2022 | Sexton | G06N 3/08 |
| 2022/0335555 | A1 * | 10/2022 | Karthik | G06Q 50/2057 |

OTHER PUBLICATIONS

Schmidt, Mischa, et al. "On the performance of differential evolution for hyperparameter tuning." 2019 international joint conference on neural networks (Ijcnn). IEEE, 2019. (Year: 2019).*
Li, Liam, et al. "Exploiting reuse in pipeline-aware hyperparameter tuning." arXiv preprint arXiv:1903.05176 (2019). (Year: 2019).*
"Stack Overflow"—https://stackoverflow.com/questions/64454879/short-circuiting-an-np-all-with-a-nested-np-less-for-large-array-comparisons-in (Year: 2020).*

* cited by examiner

*Primary Examiner* — Hal Schnee
(74) *Attorney, Agent, or Firm* — Van Pelt, Yi & James LLP

(57) ABSTRACT

A system for automated model hyperparameter determination and serving includes an interface and a processor. The interface is configured to receive a request to determine optimal hyperparameters for a model. The processor is configured to determine a framework extension to implement the model; determine an optimization assembly to support the framework extension; determine a cluster to execute the optimization assembly; determine an optimization script for the optimization assembly; cause the cluster to execute the optimization script to determine the optimal hyperparameters; and build an optimal model using the optimal hyperparameters.

22 Claims, 10 Drawing Sheets

AUTOMATED MODEL HYPERPARAMETER DETERMINATION AND SERVING

BACKGROUND OF THE INVENTION

Finding optimal values of hyperparameters for a complex prediction or classification model and building a production quality model based on those same optimal hyperparameters is crucial for delivering value to customers. Currently, there are two approaches: 1) combine libraries solving one particular problem (e.g., Sacred to keep track of experiments, HyperOpt to distribute training, etc.) into resulting system, which requires extensive manual error-prone handling in this case integration and plumbing should be performed manually which is costly, suboptimal and error prone; or 2) use a service that integrates some of the required libraries but that is restricted by the architecture and limits set by a vendor. However, these solutions do not enable a user to run trials to search the space of hyperparameters especially for systems allowing the use of any vendors cluster resources.

BRIEF DESCRIPTION OF THE DRAWINGS

Various embodiments of the invention are disclosed in the following detailed description and the accompanying drawings.

DETAILED DESCRIPTION

Figure 1:
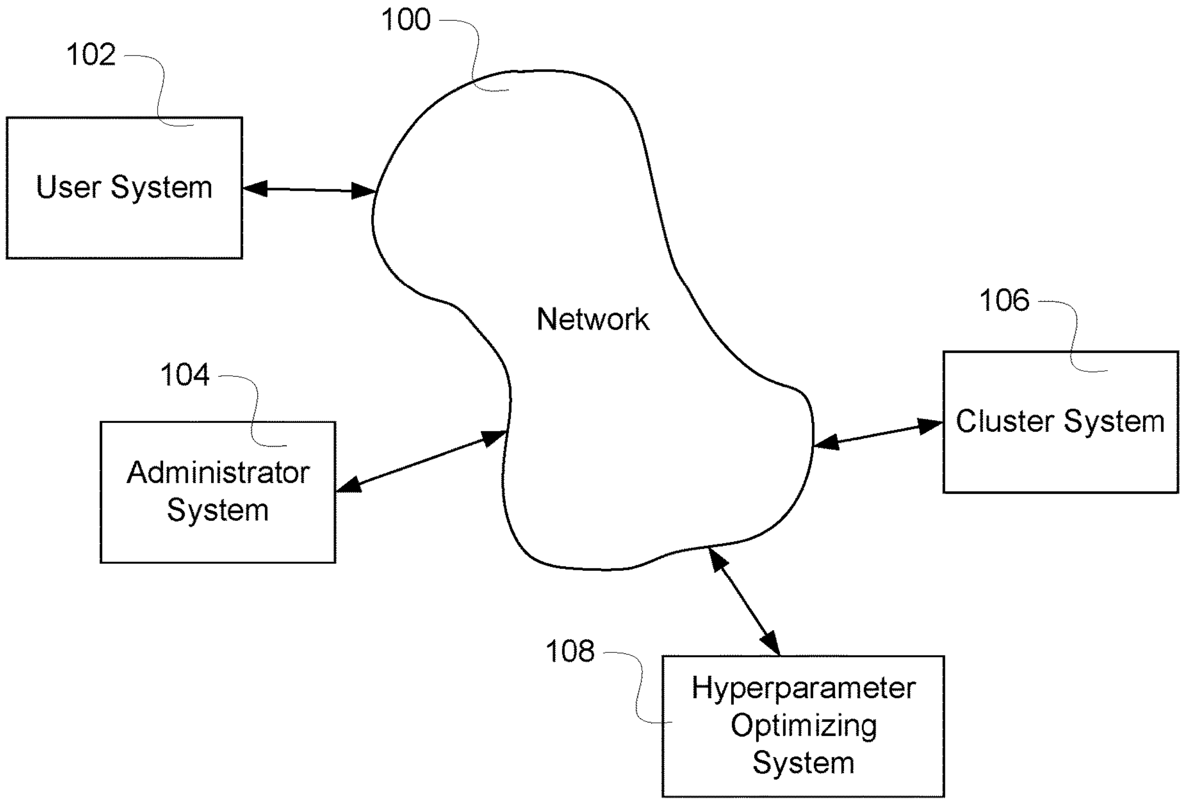
FIG. 1 is a diagram illustrating an embodiment of a system automated model hyperparameter determination and serving.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for automated model hyperparameter determination and serving is disclosed. The system includes an interface and a processor. The interface is configured to receive a request to determine optimal hyperparameters for a model. The processor is configured to determine a framework extension to implement the model; determine an optimization assembly to support the framework extension; determine a cluster to execute the optimization assembly; determine an optimization script for the optimization assembly; cause the cluster to execute the optimization script to determine the optimal hyperparameters; and build an optimal model using the optimal hyperparameters. In some embodiments, the processor is coupled to a memory that is configured to provide the processor with instructions.

A system for automated model hyperparameter determination and serving finds optimal values of hyperparameters for a complex machine learning model (e.g., a model used for prediction, classification, etc.). The system further builds a production quality model based on the optimal hyperparameter values that were found. The system is able to run individual trials comprising experiments in distributed mode, keep track of trials and resulting performance metrics in order to find the optimal values of hyperparameters, effectively search a space of hyperparameters in order to find optimal values of those hyperparameters, and train and assemble models based on optimal hyperparameters values to be deployed into a production system.

In some embodiments, the system comprises a novel framework that enables searching for optimal hyperparameters values using a standalone system (e.g., a local computation system) as well as distributed system (e.g., a cluster system). The distributed part of the framework is built on top of a framework for distributed applications (e.g., Ray) and a library built on top of that framework for scalable hyperparameters tuning (e.g., Tune). The system further includes integrated reporting tools (e.g., Sacred) in order to keep track of individual trials used in determining the optimal hyperparameters.

In some embodiments, the system assembles the necessary optimization framework components and tailors infrastructure to support distributed optimization. In some embodiments, the distributed optimization is built using Ray cluster and autoscaler. In some embodiments, the final model that is created by being trained using the optimal hyperparameters is assembled into a production microservice with the required model building framework components and infrastructure (e.g., Ray cluster and autoscaler).

The system improves the computer by removing the need to manually integrate purpose built libraries as well as transform data between steps towards determining and building an optimal hyperparameter model. This removes the possibility of errors making the system more efficient for determining optimal hyperparameters and for providing the model built from the optimal hyperparameters. Since the system is integrated and able to parallelize parameter trials, the system also is able to determine the optimal hyperparameters quickly without manual processes in between making the computer more efficient and faster in creating an optimized model.

FIG. 1 is a diagram illustrating an embodiment of a system automated model hyperparameter determination and serving. In the example shown, a user using user system 102 requests, via network 100, to determine optimal hyperparameters for a model. Network 100 is used to enable communication between user system 102, administrator system 104, cluster system 106, and/or hyperparameter optimizing system 108. Hyperparameter optimizing system 108 receives the request and determines a framework extension to implement the model. Hyperparameter optimizing system 108 further determines an optimization assembly to support the framework extension; determines a cluster to execute the optimization assembly (e.g., including setting up a master node and worker nodes in cluster system 106); determines an optimization script for the optimization assembly; cause the cluster to execute the optimization script to determine the optimal hyperparameters; and builds an optimal model using the optimal hyperparameters. Administrator system 104 is used by an administrator to administrate hyperparameter optimizing system 108.

Figure 2:
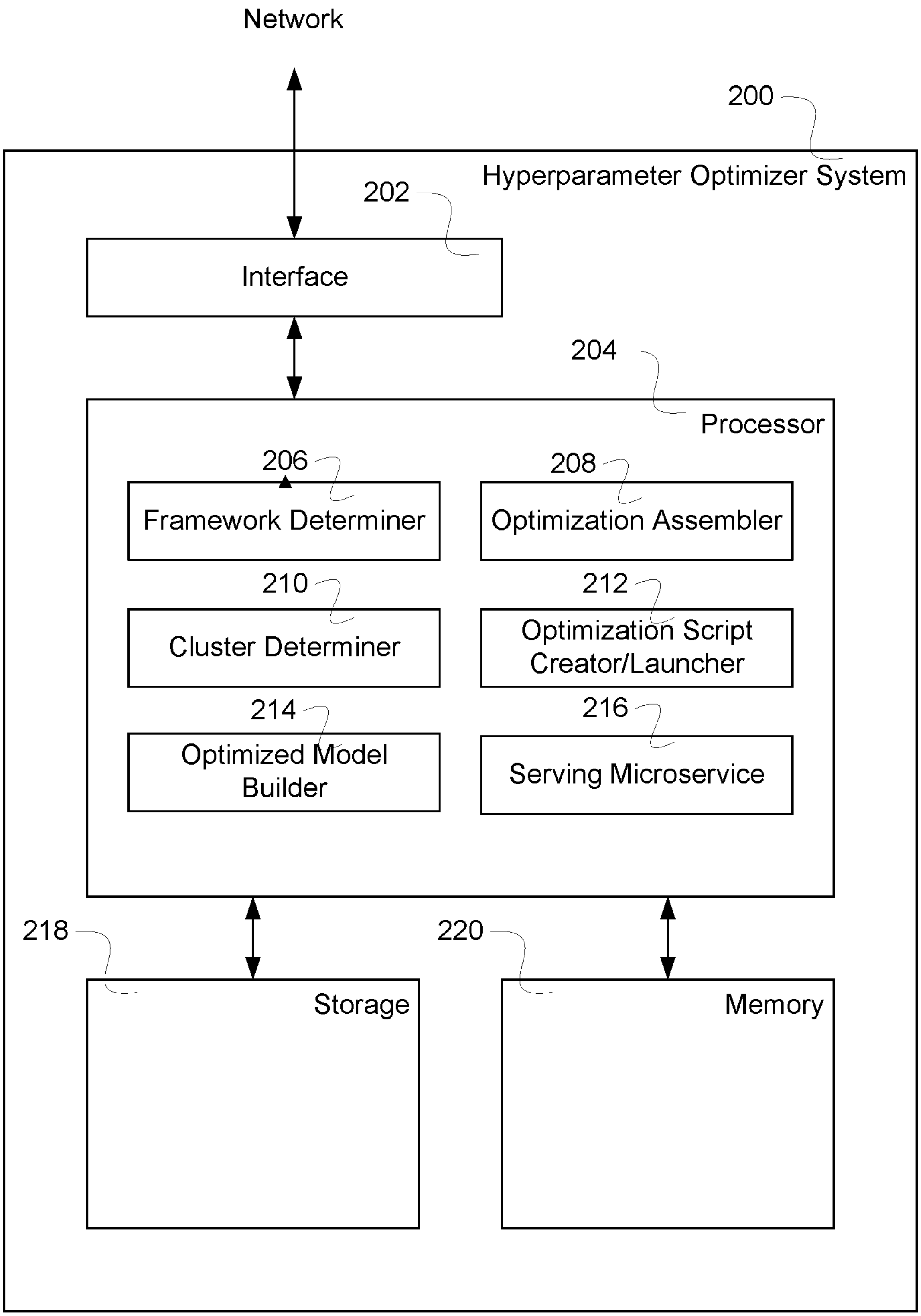
FIG. 2 is a diagram illustrating a system for hyperparameter optimization.

FIG. 2 is a diagram illustrating a system for hyperparameter optimization. In some embodiments, hyperparameter optimizer system 200 is used to implement hyperparameter optimizer system 108 of FIG. 1. In the example shown, hyperparameter optimizer system 200 includes interface 202, processor 204, storage 218, and memory 220. Processor 204 includes framework determiner 206, optimization assembler 208, cluster determiner 210, optimization script creator/launcher 212, optimized model builder 214, and serving microservice 216. Processor 204 executes instructions as stored or provided using memory 220. Processor 204 can store or access data in storage 218 or memory 220 during the execution of instructions.

In some embodiments, framework determiner 206 is used to determine a framework extension to implement the model. Framework determiner 206 checks out a framework from a repository. In some embodiments, the framework comprises one or more model implementations each with an estimator and a predictor, optimizers (e.g., a model trainer, a hyperparameter optimizer, a model evaluator, and an optimal model builder), and observers (e.g., an observer interface, a database observer, and a file observer). An estimator and a predictor communicate using model interfaces. In some embodiments, a Tune application programming interface (API) and a Ray API are used to support distributed optimization using the framework. In some embodiments, framework determiner 206 causes the estimator and predictor interfaces to be implemented with model-specific functionality. Framework determiner 206 includes a list of all supported frameworks, e.g., NBeats, Prophet, etc. The framework determiner also includes framework-specific implementations of estimator and predictor interfaces for each listed framework. Based on user-provided input of the particular framework (e.g., NBeats) the framework determiner uses estimator and predictor interface implementations for chosen framework). In some embodiments, Framework determiner 206 checks in implemented models into a framework repository (e.g., stored using storage 218).

In some embodiments, optimization assembler 208 is used to build a base Docker image supporting the framework determined using framework determiner 206. In some embodiments, optimization assembler 208 further assembles Ray and Tune APIs as well as accelerated optimization processing resources into the base Docker image. Optimization assembler 208 further builds a model-specific optimization Docker image with dependencies using the base Docker image and then stores the model-specific optimization Docker image using a repository manager (e.g., in storage 218). Optimization assembler 208 contains assembly descriptors for all supported models. Each assembly descriptor lists all required dependencies for a given model. The model-specific Docker image built using each assembly descriptor thereby includes model-specific dependencies (e.g., libraries) as well as model-specific implementation of estimator and predictor interfaces.

In some embodiments, cluster determiner 210 is used to create a cluster descriptor using a template (e.g., a serialization language (YAML) template), where the cluster descriptor includes indications of a model-specific optimization Docker image, a number of workers, networking details, repository manager credentials, etc. Cluster determiner 210 creates a cluster resource (e.g., master node, worker nodes, networking resources, etc.) using an interface (e.g., Ray API) and the cluster descriptor. Cluster determiner 210 starts Docker container on each cluster node using the provided model-specific optimization Docker image to execute an optimization trial. In various embodiments, a cluster descriptor includes a docker (e.g., a docker image and options used to run optimization—the image is provided by an optimization assembly and encapsulates all optimization logic), a provider (e.g., a provider-specific configuration—Ray supports major cloud node providers (e.g., Amazon Web Services (AWS), Google Cloud Platform (GCP), Azure, etc.), on premise node providers, directly and via container orchestration engines (Kubemetes)), a number of workers (e.g., a minimum number of workers, a maximum number of workers, an initial number of workers, etc.), an autoscaling strategy (e.g., default, aggressive, etc.), a definition of head/worker nodes (e.g., an instance type, an image identifier, etc.), and/or other settings (e.g., object store capacity, file mounts, initialization commands, etc.).

In some embodiments, optimization script creator/launcher 212 prepares an optimization script using a script template and user-defined optimization parameters (e.g., a model identifier, a configuration source, a data source, an experiment name, a number of trials, a number of epochs per trial, etc.). Optimization script creator/launcher 212 describes importing training data (i.e., input data) and validation data (i.e., target data) from user-defined source (e.g., Amazon Simple Storage Service (S3), file system, etc.) and persisting the data in a common storage accessible by all cluster workers so that trials can reuse the data. Optimization script creator/launcher 212 indicates importing initial model configuration from a user-defined source (e.g., S3, file system, default location, etc.) and creating a model estimator using the configuration. Optimization script creator/launcher 212 indicates creating, on a master node, framework components (e.g., hyperparameter optimizer, observer, training data identifiers, etc.). Optimization script creator/launcher 212 indicates launching, on the master node, the hyperparameter optimizer, which in turn assigns trials to workers.

Optimization script creator/launcher 212 indicates to persist each trial's configuration and resulting performance metric (s) in a database.

In some embodiments, optimization script creator/launcher 212 cause the optimization script to execute on the created cluster resources. Optimization script creator/launcher 212 causes supplying experiment parameters to the master node and the distributed model trainers on the worker nodes. In various embodiments, the experiment parameters comprise one or more of a number of trials, a number of iterations per trial, dataset names, etc.). Optimization script creator/launcher 212 causes the input data and target data to be imported from the designated data store and transformed to be used by all distributed model trainers. For example, the data transformation is comprised of (1) transforming the data into computationally optimized structures (e.g., numpy arrays allowing short-circuiting) so that model-specific estimator and model-specific predictor implementations can manipulate data efficiently and (2) transforming the data into common data store format (e.g., a format provided by Ray), so that data put in the common data store is effectively cached and used by all Model Trainers avoiding reimporting the same data by each Model Trainer individually. Optimization script creator/launcher 212 causes the initial model configuration to be imported from a designated data store. This is the starting point for a search for optimal hyperparameters. Optimization script creator/launcher 212 further causes, via the optimization script, the cluster resources to generate an instance of hyperparameter values (e.g., using a hype parameter optimizer of a framework loaded on a worker) that are then provided to a model trainer to be executed. Optimization script creator/launcher 212 causes the model trainer then to produce a trained model given the instance of the hyperparameter values. Optimization script creator/launcher 212 causes a model evaluator to evaluate the trained model and (a) to persist evaluation results and the corresponding hyperparameters and (b) send evaluation results to the hyperparameter optimizer to enable determining a next instance of hyperparameter values for a next trial creating a next trained model. Optimization script creator/launcher 212 causes a determination of whether there are more trials (e.g., sufficiently good results as measured using a metric distance between the output of a trained model using the input data to the desired target data, a number of trials has been reached, etc.). In response to determining that there are more trials, a next set of hyperparameters for a next trial is determined and a next trial is caused to be executed. In response to determining that there are not more trials, the results of the trails are provided (e.g., a pointer to stored results, a best result, etc.). The results of the trails include the optimal hyperparameters.

In some embodiments, optimized model builder 214 causes a process to be executed by the cluster resources to build the optimal model using the optimal hyperparameters. For example, the process includes preparing a model building script using a script template and user-defined parameters. In various embodiments, the user-defined parameters comprise a source for optimal model hyperparameters configuration, a training data source (e.g., input data source and target data source), a number of training epochs, a destination to persist the trained model predictor, and/or any other appropriate parameter. Optimized model builder 214 causes the importing of input data and target data from user-defined sources (e.g., S3, a file system, etc.). Optimized model builder 214 causes the creation of the model estimator using the optimal model hyperparameters configuration. Optimized model builder 214 causes creation of framework components, on the master node, including a model builder, a training data identifier, etc. Optimized model builder 214 causes the launch of a single model building trial that outputs a trained model predictor and causes the trained model predictor to be persisted in a user-defined destination.

In some embodiments, serving micorservice 216 causes building of a model-specific serving Docker image that is comprised of the trained model predictor and its dependencies and additional required services (e.g., Nginx, Gunicorn, Flask, etc.). For example, For example, Docker image serving predictions based on NBeats model is comprised of such key (1) dependencies: Ray, Tune, PyMongo, Tabulate, HyperOpt, Sacred, Boto3, MXNet-cu102, Gluon Time Series (GluonTS), orjson and (2) services: Nginx, Gunicorn, Flask workers, model-specific Predictor implementation. Serving micorservice 216 causes pushing the model-specific serving Docker image into a managed repository (e.g., in storage 218). Serving micorservice 216 causes the deploying of the serving microservice on production from the managed repository.

In some embodiments, a trained Predictor together with additional required components is assembled into serving microservice 216 which is deployed into production and serves predictions given input. In some embodiments, serving microservice 216 includes components:

Nginx: front-end hypertext transfer protocol (HTTP) proxy server (also handles hypertext transfer protocol secure (HTTPS) traffic, buffers slow clients)

Gunicorn: webserver gateway interface (WSGI) HTTP server managing application processes Flask: provides API to serve predictions. Uses Predictor internally Predictor: imported into memory by each worker independently, generates predictions given input Predictor dependencies: libraries required by Predictor to process input. Same as for optimization assembly.

Advanced assemblies would include the following pieces:

web server container (Nginx): same as above plus serving as load balancer for application server containers application server container (e.g., Gunicorn, Flask, Predictor and its dependencies): several instances might be managed by e.g., Kubernetes and load balanced by a web server for high availability.

Figure 3:
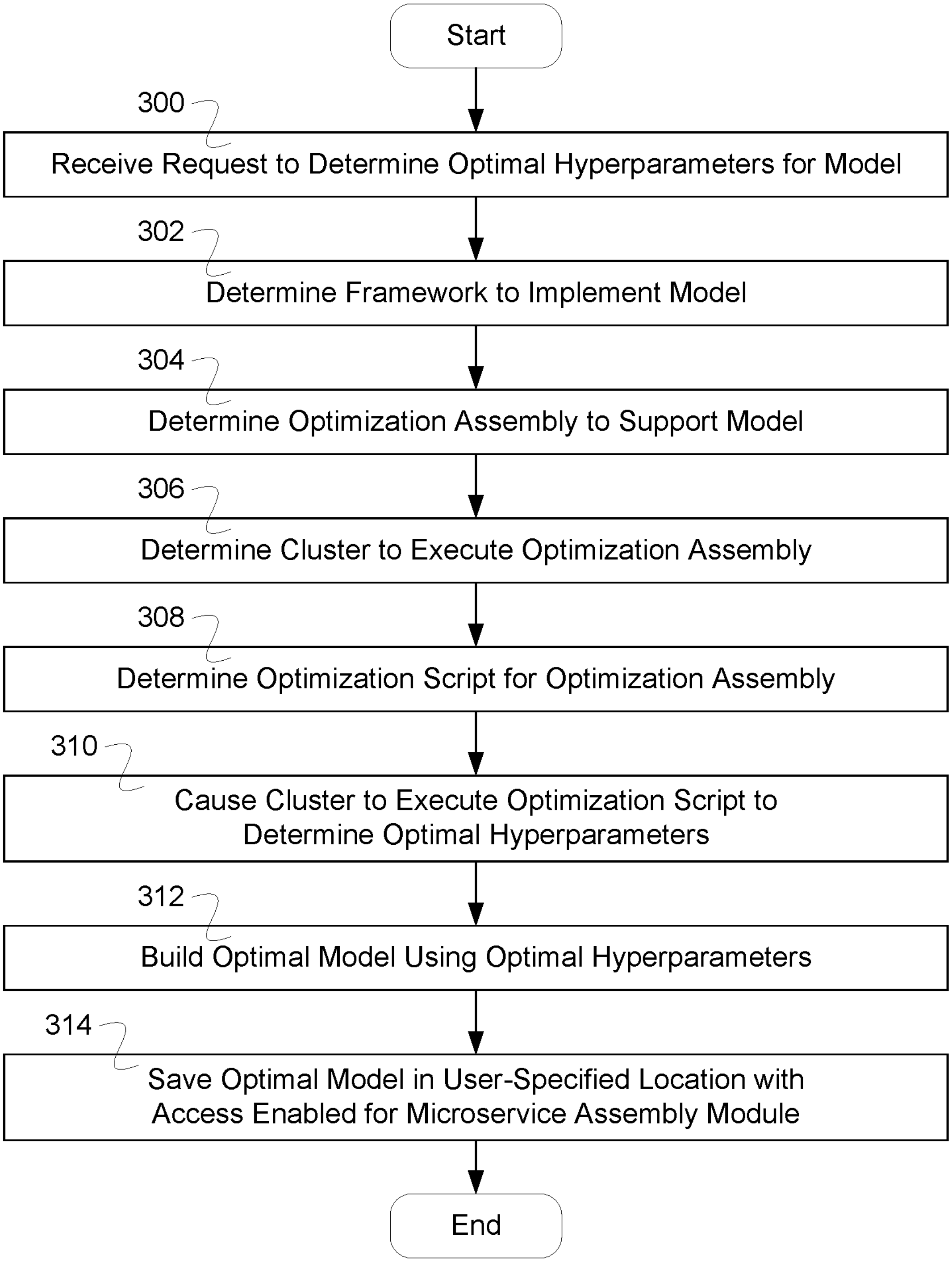
FIG. 3 is a flow diagram illustrating an embodiment of a process for automated model hyperparameter determination and serving.

FIG. 3 is a flow diagram illustrating an embodiment of a process for automated model hyperparameter determination and serving. In some embodiments, the process of FIG. 3 is executed using processor 204 of FIG. 2. In the example shown, in 300 a request is received to determine optimal hyperparameters for a model. For example, a user using a user system requests to a hyperparameter optimizing system to optimize hyperparameters for a model (e.g., a machine learning or other expert system model). In 302, a framework is determined to implement the model. For example, a framework (e.g., NBeats) is determined using a framework determiner to implement the model. In 304, an optimization assembly is determined to support the model. In 306, a cluster is determined to execute the optimization assembly. In 308, an optimization script is determined for the optimization assembly. In 310, an optimization script is caused to be executed on the cluster to determine optimal hyperparameters. In 312, an optimal model is built using the optimal hyperparameters. In 314, an optimal model is saved in a user-specified location with access enabled for an assembly module. In some embodiments, the assembly module comprises a microservice.

Figure 4:
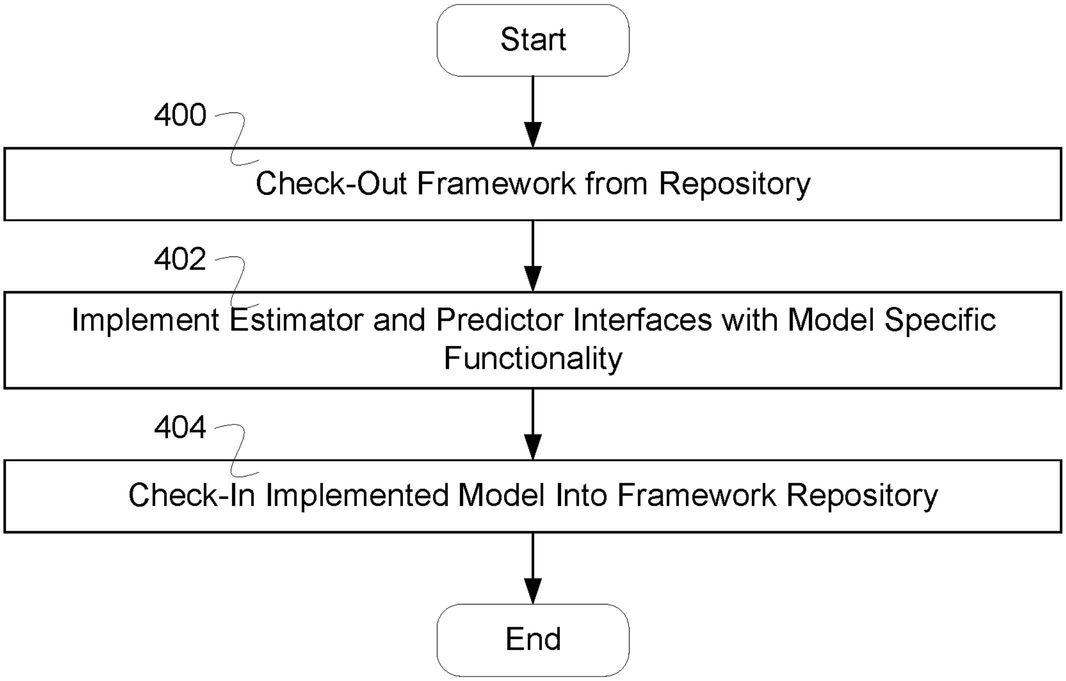
FIG. 4 is a flow diagram illustrating an embodiment of a process for a framework extension.

FIG. 4 is a flow diagram illustrating an embodiment of a process for a framework extension. In some embodiments, the process of FIG. 4 is used to implement 302 of FIG. 3. In the example shown, in 400 a framework is checked out from a repository. In 402, an estimator interface and a predictor interface are implemented with model specific functionality. For example, for each model (i.e., framework extension), the contract (e.g., how model should be trained, how results should be served, etc.) specified by estimator and predictor interfaces is implemented for that particular model in model-specific way In 404, an implemented model is checked into a framework repository.

Figure 5:
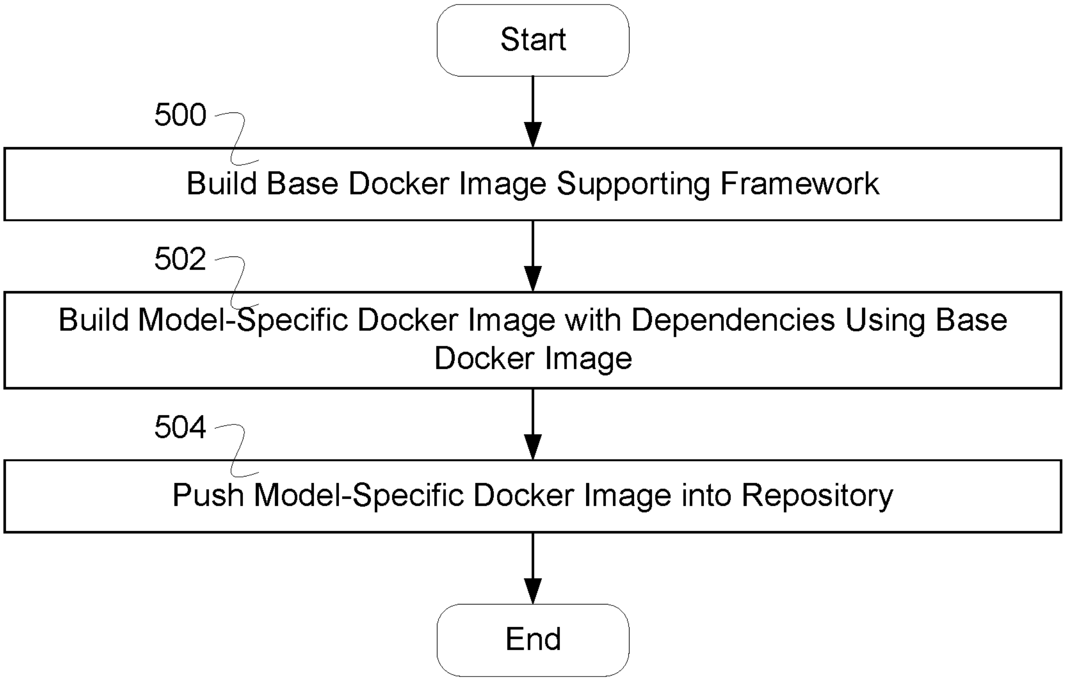
FIG. 5 is a flow diagram illustrating an embodiment of a process for an optimization assembly.

FIG. 5 is a flow diagram illustrating an embodiment of a process for an optimization assembly. In some embodiments, the process of FIG. 5 is used to implement 304 of FIG. 3. In the example shown, in 500 a base Docker image supporting framework is built. In 502, a model-specific Docker image is built with dependencies using the base Docker image. In 504, the model-specific Docker image is pushed into a repository. For example, the model-specific Docker image produced by an optimization assembly module is stored in a repository using a repository manager.

Figure 6:
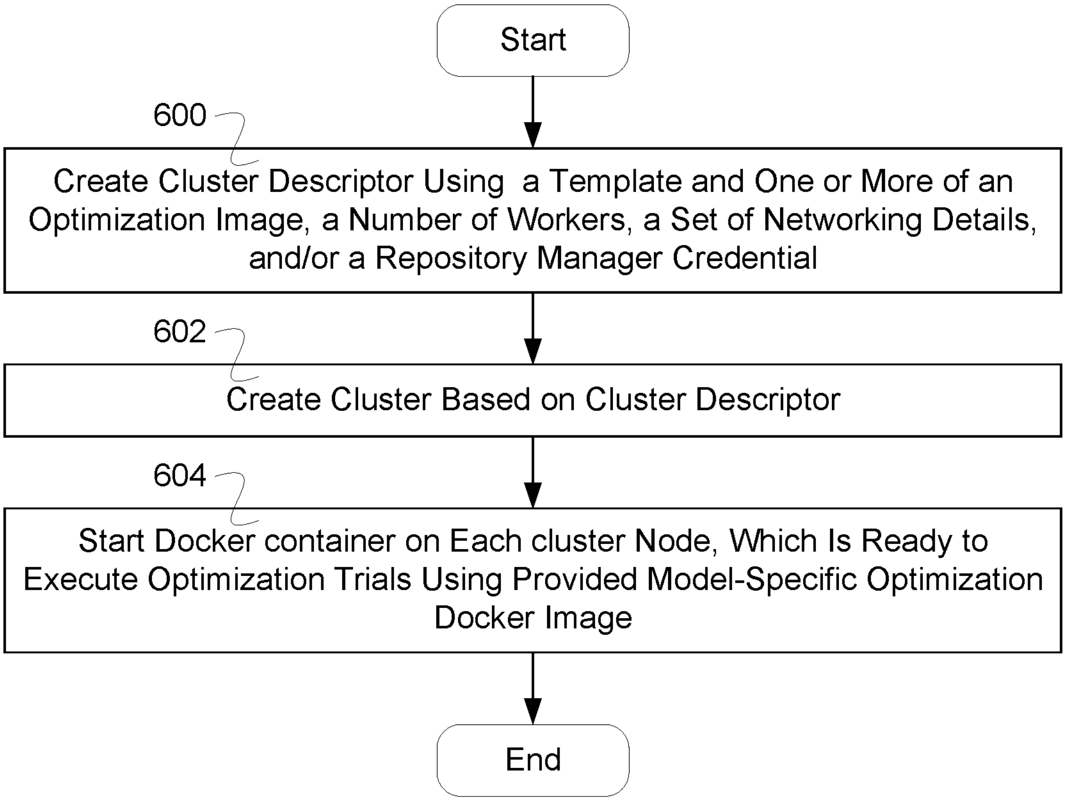
FIG. 6 is a flow diagram illustrating an embodiment of a process for a cluster determination.

FIG. 6 is a flow diagram illustrating an embodiment of a process for a cluster determination. In some embodiments, the process of FIG. 6 is used to implement 306 of FIG. 3. In the example shown, in 600 a cluster descriptor is created using a template and one or more of an optimization image or images, a number of workers, a set of networking details, and/or a repository manager credential or credentials. In 602, a cluster is created based on the cluster descriptor. For example, a cluster is caused to be created in a cluster system based on the cluster descriptor. In 604, a Docker container is started in each cluster node, which is ready to execute optimization trials using a provided model-specific optimization Docker image.

Figure 7:
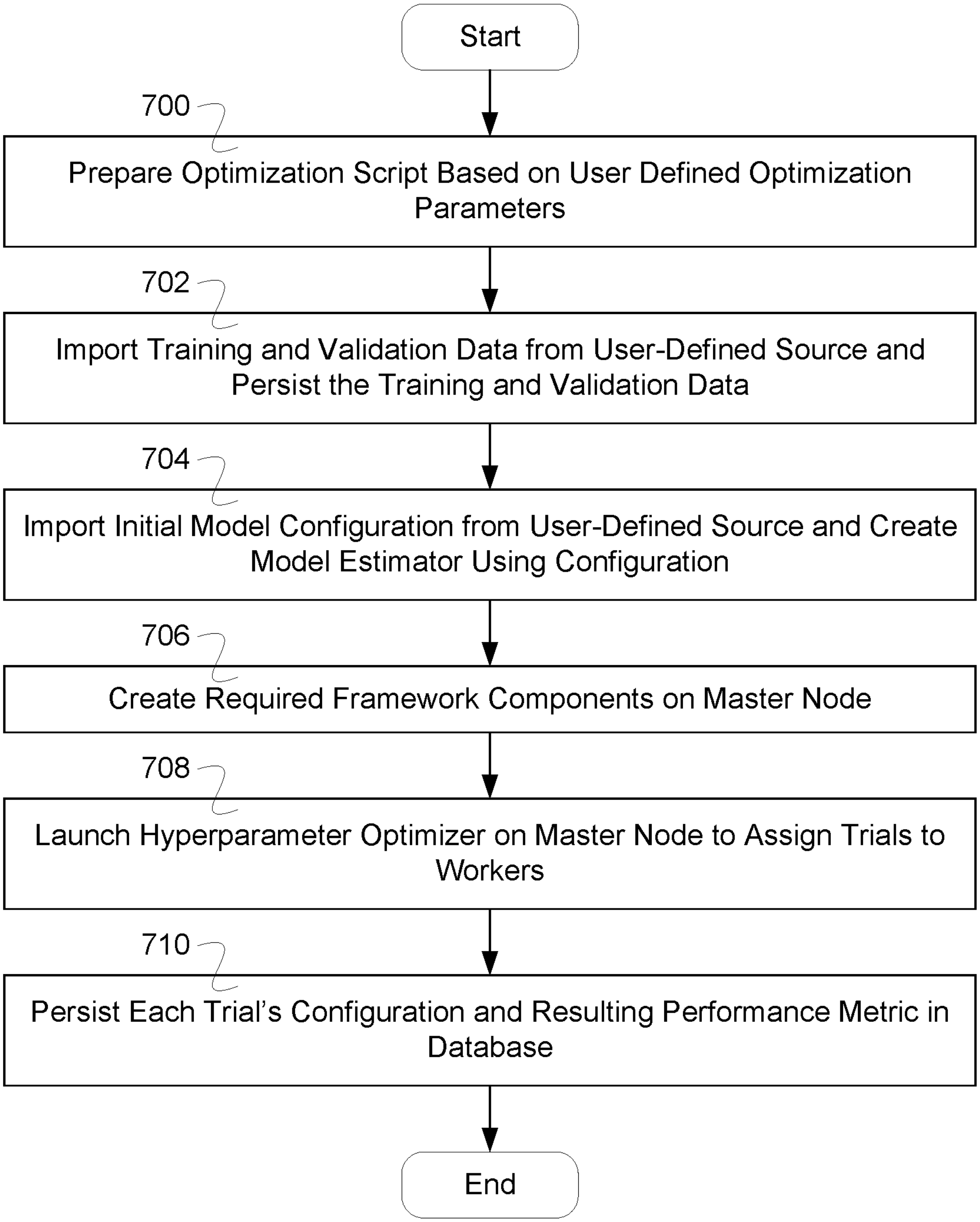
FIG. 7 is a flow diagram illustrating an embodiment of a process for determining an optimization script.

FIG. 7 is a flow diagram illustrating an embodiment of a process for determining an optimization script. In some embodiments, the process of FIG. 7 is used to implement 308 of FIG. 3. In the example shown, in 700 an optimization script is prepared based on user defined optimization parameters. In 702, training and validation data are imported from a user defined source and are persisted the training and validation data. For example, the training data (e.g., input data) and validation data (e.g., target data) are transformed and stored in a commonly accessible data store so that the data can be easily and efficiently read for the trials running on the cluster. In 704, an initial model configuration is imported from a user defined source and a model estimator is created using the configuration. For example, the initial model configuration comprises initial values of hyperparameters for given model. In some embodiments, the initial values are used as a starting point for a hyperparameter optimizer system to search for better combinations of values yielding better models. In 706, a required framework components are created on a master node. In 708, a hyperparameter optimizer is launched on the master node to assign trials to workers. In 710, each trial's configuration and resulting performance metric are persisted in a database. In some embodiments, configurations are model dependent: one model requires hyperparameters A and B, whereas another model requires hyperparameters C, D and E. Performance metrics are used by the hyperparameter optimizer system to evaluate models created during optimization trials. Performance Metrics are generally applicable for families of models (e.g. classification, prediction, etc.)—for example, mean-squared-error, symmetric mean absolute percentage error (sMAPE), etc.

Figure 8:
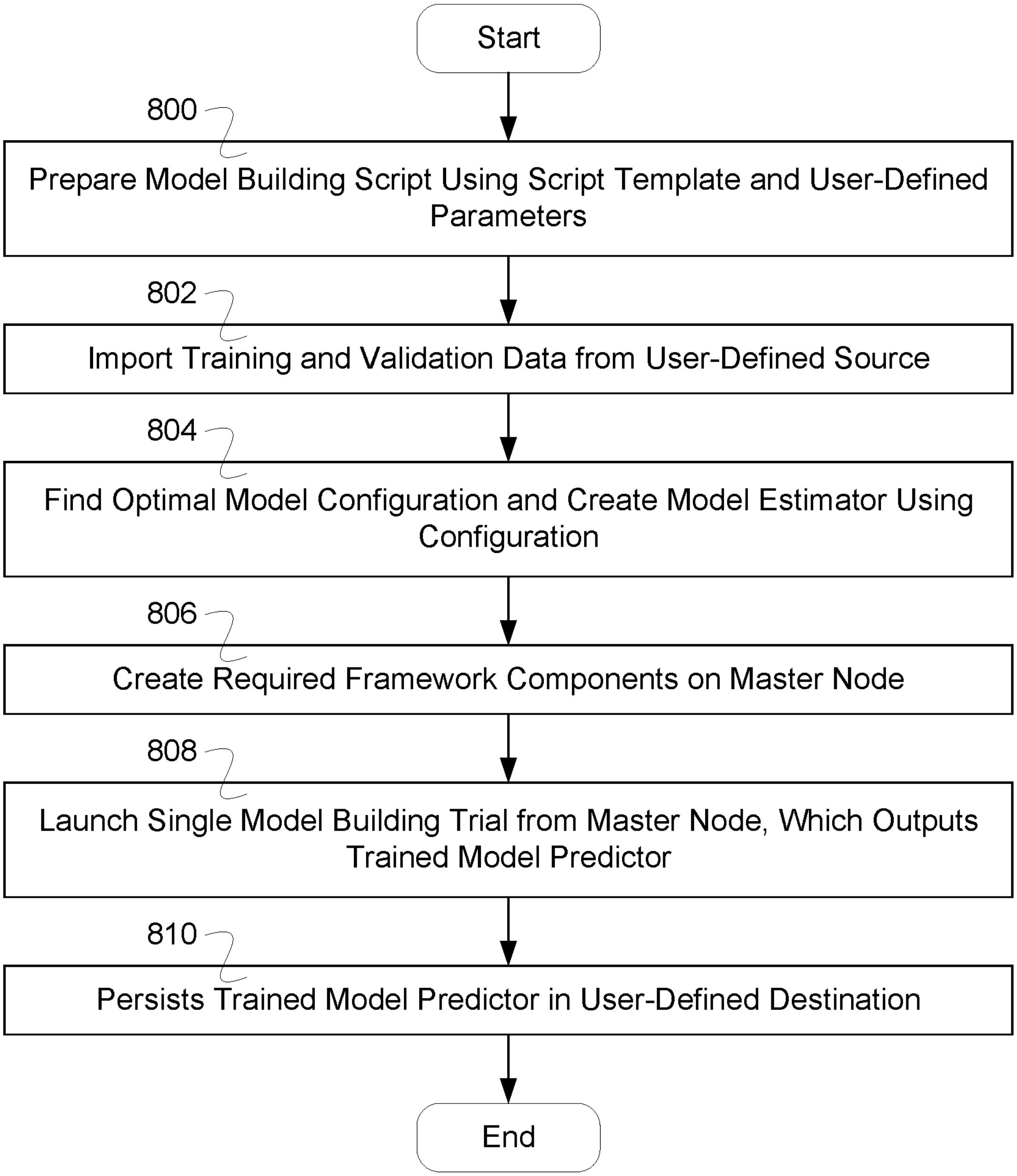
FIG. 8 is a flow diagram illustrating an embodiment of a process for causing an optimization script to be executed.

FIG. 8 is a flow diagram illustrating an embodiment of a process for causing an optimization script to be executed. In some embodiments, the process of FIG. 8 is used to implement 310 of FIG. 3. In the example shown, in 800 a model building script is prepared using a script template and user defined parameters. In 802, training and validation data are imported from a user defined source. In 804, an optimal model configuration is found and a model estimated is created using the configuration. In 806, required framework components are created on a master node. In 808, a single model building trial is launched, which outputs a trained model predictor. In 810, a trained model predictor is persisted in a user defined destination.

Figure 9:
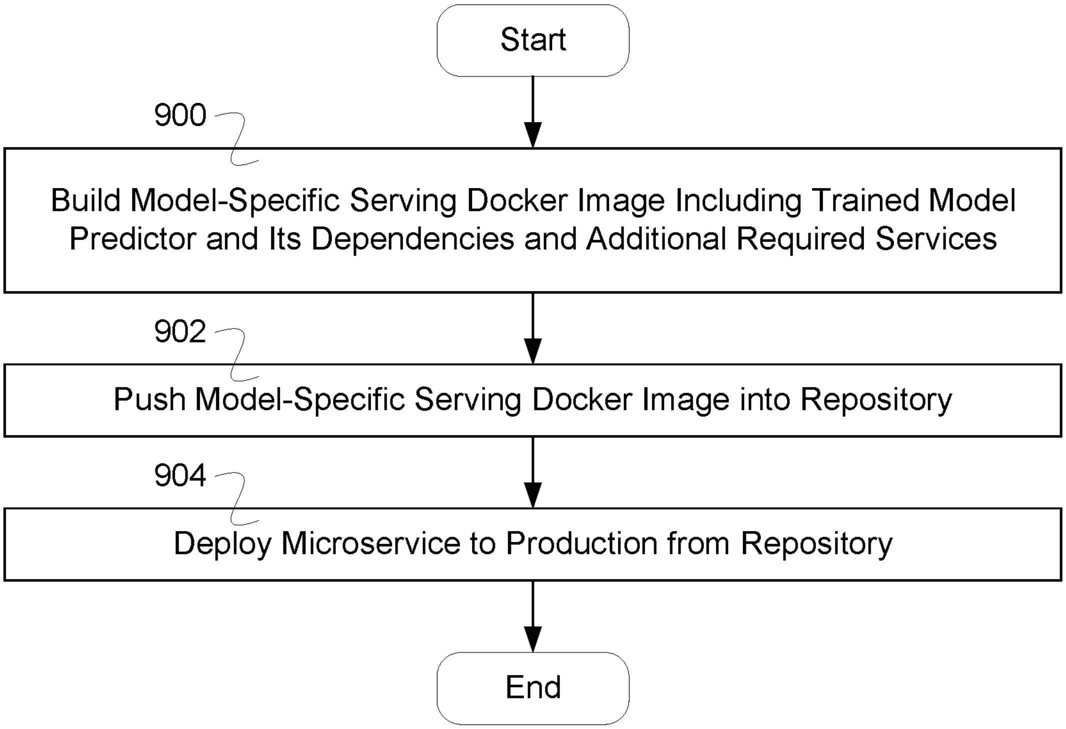
FIG. 9 is a flow diagram illustrating an embodiment of a process for building an optimal model.

FIG. 9 is a flow diagram illustrating an embodiment of a process for building an optimal model. In some embodiments, the process of FIG. 9 is used to implement 312 of FIG. 3. In the example shown, in 900 a model specific serving Docker image is built including a trained model predictor and its dependencies and additional required services. For example, Docker image serving predictions based on NBeats model is comprised of such key (1) dependencies: Ray, Tune, PyMongo, Tabulate, HyperOpt, Sacred, Boto3, MXNet-cu102, Gluon Time Series (GluonTS), orjson and (2) services: Nginx, Gunicorn, Flask workers, model-specific Predictor implementation. In 902, the model specific serving Docker image is pushed into a repository. For example, the model specific serving Docker image is pushed into a repository using repository manager. In 904, a microservice is deployed to production from the repository. For example, a microservice, which comprises a Docker container created from a model specific Docker image, is deployed to production from the repository. In some embodiments, the microservice is created from a Docker image which already includes the optimal model, where the model is copied from repository into Docker image at Docker image creation step.

Figure 10:
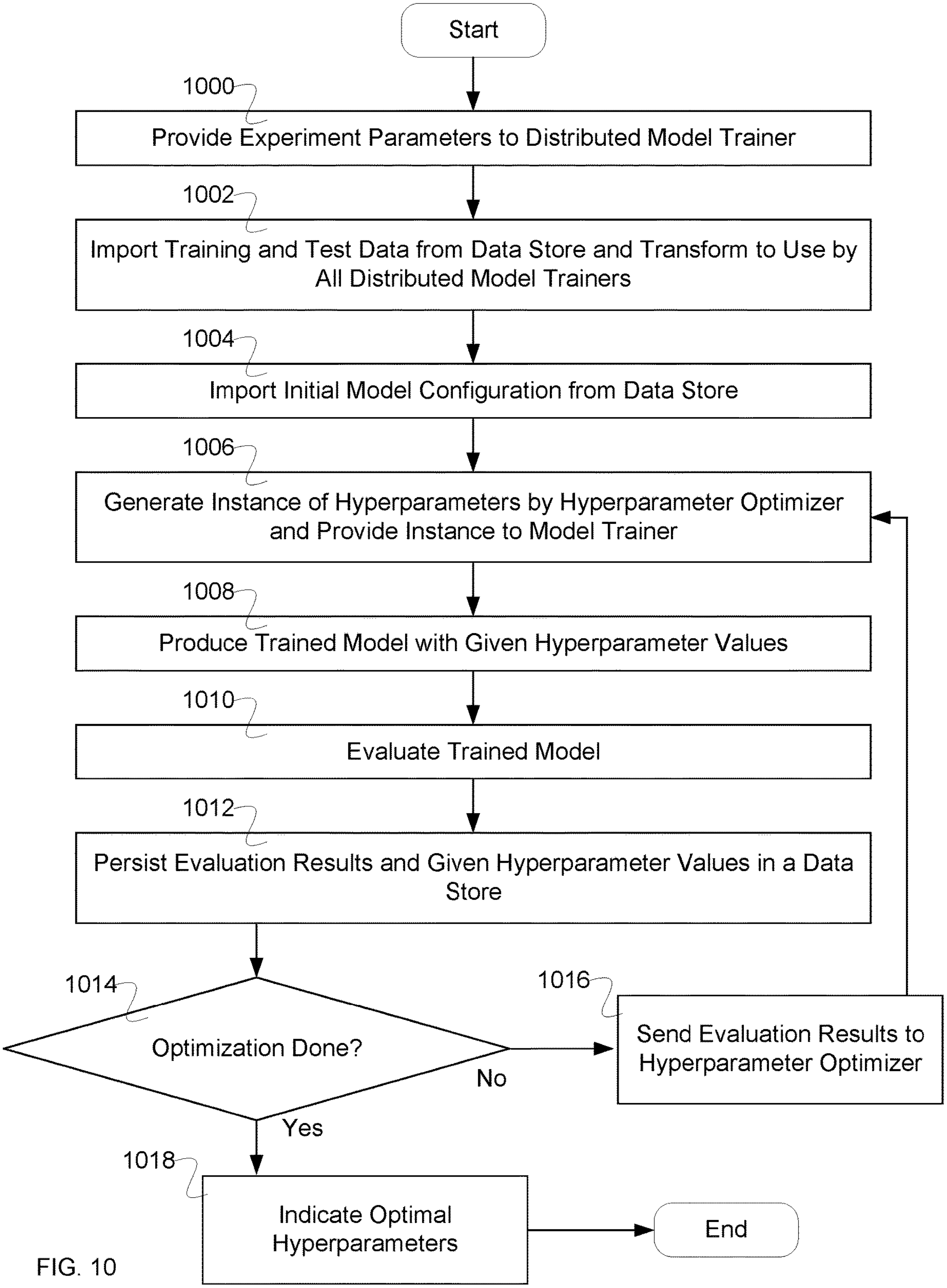
FIG. 10 is a flow diagram illustrating an embodiment of a process described by an optimization script.

FIG. 10 is a flow diagram illustrating an embodiment of a process described by an optimization script. In some embodiments, the process of FIG. 10 is used to implement the execution caused by an optimization script by a cluster. In the example shown, in 1000 experiment parameters are provided to distributed model trainers. For example, the processor causes the optimization script to execute using the cluster to provide experiment parameters to distributed model trainers. In 1002, training and test data are imported from a data store and transformed to be used by all distributed model trainers. For example, the processor causes the optimization script to execute using the cluster to import training data (e.g., input data) and test data (e.g., target data) from a data store and transform to be efficiently used and stored by all worker models. In some embodiments, data transformation is comprised of (1) transforming the data into computationally optimized structures (e.g., NumPy arrays allowing short-circuiting) so that model-specific estimator and predictor implementations manipulate data efficiently and (2) transforming the data into common data store format (e.g., a format as provided by Ray), so that data put in the common data store is effectively cached and used by all Model Trainers avoiding reimporting same data by each Model Trainer individually. In 1004, initial model configuration is imported from a data store. For example, an initial model configuration comprises initial values of hyperparameters for a given model. In some embodiments, the initial values are used as a starting point for the hyperparameter optimizer system to search for better combinations of values yielding better models. For example, the processor causes the optimization script to execute using the cluster to import an initial model configuration from a data store. In 1006, an instance of hyperparameters is generated by a hyperparameter optimizer and provide instance to a model trainer. For example, the processor causes the optimization script to execute using the cluster to generate an instance of hyperparameters using a hyperparameter optimizer and to provide the instance to a model trainer. In 1008, a trained model is produced with the given hyperparameter values. For example, the processor causes the optimization script to execute using the cluster to produce a trained model with the given hyperparameter values. In 1010, a trained model is evaluated. For example, the processor causes the optimization script to execute using the cluster to evaluate the trained model. In 1012, evaluation results and given hyperparameter values are persisted in a data store. For example, the processor causes the optimization script to execute using the cluster to persist evaluation results and given hyperparameter values in a data store. In 1014, it is determined whether the optimization is done. For example, the processor causes the optimization script to execute using the cluster to determine whether the optimization is done. In various embodiments, optimization is determined to be done in response to a count of epoch being completed, a metric being below a threshold value, or any other appropriate criteria for being done. In response to determining that the optimization is not done, in 1016 evaluation results are sent to hyperparameter optimizer. For example, the processor causes the optimization script to execute using the cluster to send the hyperparameter optimizer the evaluation results so that the optimizer can determine a next set of hyperparameters for a trial to determine an optimal set of hyperparameters. In response to determining that the optimization is done, in 1018 the optimal hyperparameters are indicated, and the process ends. For example, the processor causes the optimization script to execute using the cluster to indicate the optimal hyperparameters to the original process that launched the optimization in the cluster (e.g., the process running on the hyperparameter optimizer system).

In some embodiments, the models of a framework comprise an estimator and a predictor. In some embodiments, the estimator comprises an interface for a model for training including a configuration (e.g., a model specific configuration), a metric being optimized (e.g., sMAPE for NBeats), an optimization mode: minimum or maximum that depends on a metric, a search space (e.g., a set of hyperparameters and value ranges to search for optimal model, a training logic (e.g., defines model-specific training logic that returns a trained model to be used by the predictor). In some embodiments, the predictor comprises an interface for a trained inference based model including a predictor that generates predictions based on an encapsulated training model. In some embodiments, the estimator and predictor, together with model-specific dependencies, such as ML framework (e.g., Tensorflow, PyTorch, MXNet, Keras, etc.) can become a self-contained model that are either used in a standalone or distributed search and training setup.

In some embodiments, when searching a space of hyperparameters, a configuration for individual trial (reference to train/test datasets, values of hyperparameters, seed, epochs etc.) as well as any resulting outcome (value of model-specific target metric), the inputs and results should be recorded. This is so that the experiments can be analyzed to find the optimal configuration. In some embodiments, a framework is integrated with an observer tool (e.g., a Sacred tool). In some embodiments, other observer implementations (e.g., observers based on an observer interface) may be plugged in—for example, a custom database observer, file observer, s3 observer etc.

In some embodiments, each model requires its own set of versioned dependencies. For example, model based on NBeats requires MXNet ML Framework of version 1.6.x. In order to avoid possible conflicts of dependencies and reduce resulting assembly size, each model together with its dependencies and common framework components required for hyperparameters optimization and training are assembled into a Docker image. The Docker image encapsulates all optimization logic and is meant to be deployed into infrastructure for distributed hyperparameter search and optimal model training. The Docker image is based on compute unified device architecture (CUDA) and a CUDA deep neural network library (cuDNN) images to leverage accelerated optimization using graphics processing units (GPUs). In some embodiments, the Docker image for given model is built by passing '—target [ModelX]' argument to 'docker build' command.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:

an interface configured to:

receive a request to determine optimal hyperparameters for a model, wherein the request comprises user defined optimization parameters comprising an input data source, a target data source, and an initial model configuration source;

a processor configured to:

determine a framework extension to implement the model, wherein the framework extension comprises a model trainer for the model;

determine an optimization assembly based at least in part on the user defined optimization parameters;

determine a cluster to execute the optimization assembly, wherein the cluster comprises a master node and worker nodes, and wherein the model trainer is distributed to the worker nodes;

determine an optimization script for the optimization assembly using an optimization script template and the user defined optimization parameters;

cause the cluster to execute the optimization script to determine the optimal hyperparameters, wherein executing the optimization script comprises:

providing experiment parameters to the distributed model trainers;

importing an input data from the input data source and a target data from the target data source;

transforming the input data and the target data into transformed data in a data store format, wherein the transformed data comprises NumPy arrays allowing short-circuiting;

persisting the transformed data in a common data store used by all of the distributed model trainers;

determining an instance of hyperparameter values for a trial of a trained model;

producing the trained model using the instance of the hyperparameter values;

determining evaluation results from an evaluation of the trained model using the transformed data and short circuiting;

determining whether there is a next trial of a next trained model; and in response to a determination that there is not t e next trial of the next trained model, providing the optimal hyperparameters, wherein the optimal hyperparameters are based at least in part on the evaluation results; and build an optimal model using the optimal hyperparameters.

2. The system of claim 1, wherein determining the optimization assembly includes splitting the input data and the target data for the model, wherein the input data is used to feed the model and the target data is used to adjust the model to move the model output to match the target data after feeding the input data into the model.

3. The system of claim 2, wherein determining the optimization script includes creating instructions for transforming the input data or the target data into one or more NumPy arrays to optimize computation.

4. The system of claim 2, wherein determining the optimization script includes creating instructions for persisting the one or more NumPy arrays in the common data store.

5. The system of claim 1, wherein the optimization script causes hyperparameters to be stored in a database for use in finding the optimal hyperparameters.

6. The system of claim 1, wherein the optimization script comprises instructions to a number of trials, wherein each trial comprises building a trial model with a set of hyperparameters, evaluating the trial model results with the results for the trial model, and refining the set of hyperparameters to create a next set of hyperparameters for a next trial model build.

7. The system of claim 1, wherein the processor is further configured to save the optimal model in a user-specified location so that access by an assembly module is enabled.

8. The system of claim 1, wherein the framework extension implements estimator and predictor interfaces with model-specific functionality that is checked into a framework repository.

9. The system of claim 1, wherein the optimization assembly builds a base Docker image supporting the framework extension and a model-specific Docker image with dependencies using the base Docker image, and wherein the model-specific Docker image is pushed into a repository.

10. The system of claim 1, wherein the cluster is created based at least in part on a cluster descriptor using a template and one or more of an optimization image, a number of workers, a set of networking details, and/or a repository manager credential.

11. The system of claim 10, wherein a Docker container is started on each cluster node ready to execute optimization trials using a model-specific Docker image.

12. The system of claim 1, wherein the user defined optimization parameters comprise the experiment parameters.

13. The system of claim 12, wherein the experiment parameters include one or more of a number of trials and a number of epochs per trial.

14. The system of claim 1, wherein the optimization script includes instructions for creating on a master node of the cluster framework components including one or more of a hyperparameter optimizer, an observer, and/or a training data identifier.

15. The system of claim 14, wherein the optimization script includes instructions for launching on the master node of the cluster the hyperparameter optimizer, which assigns trials to workers of the cluster.

16. The system of claim 1, wherein building the optimal model includes creating required framework components including a model builder and a training data identifier.

17. The system of claim 1, wherein building the optimal model includes launching from a master node a trial that outputs a trained model Predictor.

18. The system of claim 17, wherein the optimal model is used to build a model specific serving Docker image including the trained model Predictor, dependencies, and required services.

19. The system of claim 1, wherein executing the optimization script comprises in response to a determination that there is a next trial of a next trained model, determine a next set of hyperparameter values for the next trained model.

20. The system of claim 1, wherein the optimal model is trained using the optimal parameters and assembled into a production microservice.

21. A method, comprising:

receiving a request to determine optimal hyperparameters for a model, wherein the request comprises user defined optimization parameters comprising an input data source, a target data source, and an initial model configuration source;

determining, using a processor, a framework extension to implement the model, wherein the framework extension comprises a model trainer for the model;

determining an optimization assembly based at least in part on the user defined optimization parameters;

determining a cluster to execute the optimization assembly, wherein the cluster comprises a master node and worker nodes, and wherein the model trainer is distributed to the worker nodes;

determining an optimization script for the optimization assembly using an optimization script template and the user defined optimization parameters;

causing the cluster to execute the optimization script to determine the hyperparameters, wherein executing the optimization script comprises:

providing experiment parameters to the distributed model trainers;

importing an input data from the input data source and a target data from the target data source;

transforming the input data and the target data into transformed data in a data store format, wherein the transformed data comprises NumPy arrays allowing short-circuiting;

persisting the transformed data in a common data store used by all of the distributed model trainers;

determining an instance of hyperparameter values for a trial of a trained model;

producing the trained model using the instance of the hyperparameter values;

determining evaluation results from an evaluation of the trained model using the transformed data and short circuiting;

determining whether there is a next trial of a next trained model; and in response to a determination that there is not the next trial of the next trained model, providing the optimal hyperparameters, wherein the optimal hyperparameters are based at least in part on the evaluation results; and building an optimal model using the optimal hyperparameters.

22. A computer program product embodied in a non-transitory computer readable medium and comprising computer instructions for:

receiving a request to determine optimal hyperparameters for a model, wherein the request comprises user defined optimization parameters comprising an input data source, a target data source, and an initial model configuration source;

determining, using a processor, a framework extension to implement the model, wherein the framework extension comprises a model trainer for the model;

determining an optimization assembly based at least in part on the user defined optimization parameters;

determining a cluster to execute the optimization assembly, wherein the cluster comprises a master node and worker nodes, and wherein the model trainer is distributed to the worker nodes;

determining an optimization script for the optimization assembly using an optimization script template and the user defined optimization parameters;

causing the cluster to execute the optimization script to determine the hyperparameters, wherein executing the optimization script comprises:

providing experiment parameters to the distributed model trainers;

importing an input data from the input data source and a target data from the target data source;

transforming the input data and the target data into transformed data in a data store format, wherein the transformed data comprises NumPy arrays allowing short-circuiting;

persisting the transformed data in a common data store used by all of the distributed model trainers;

determining an instance of hyperparameter values for a trial of a trained model;

producing the trained model using the instance of the hyperparameter values;

determining evaluation results from an evaluation of the trained model using the transformed data and short circuiting;

determining whether there is a next trial of a next trained model; and in response to a determination that there is not the next trial of the next trained model, providing the optimal hyperparameters, wherein the optimal hyperparameters are based at least in part on the evaluation results; and building an optimal model using the optimal hyperparameters.

* * * * *